(12) United States Patent
Ichimura et al.

(10) Patent No.: US 8,648,312 B2
(45) Date of Patent: Feb. 11, 2014

(54) RADIATION DETECTION APPARATUS, MANUFACTURING METHOD THEREOF, AND RADIATION DETECTION SYSTEM

(75) Inventors: Tomoaki Ichimura, Kitamoto (JP); Satoshi Okada, Tokyo (JP); Kazumi Nagano, Fujisawa (JP); Keiichi Nomura, Honjo (JP); Yohei Ishida, Honjo (JP); Yoshito Sasaki, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/528,963

(22) Filed: Jun. 21, 2012

(65) Prior Publication Data

US 2013/0026377 A1    Jan. 31, 2013

(30) Foreign Application Priority Data

Jul. 27, 2011 (JP) .................................. 2011-164766

(51) Int. Cl.
*G01T 1/20* (2006.01)

(52) U.S. Cl.
USPC ........................................................ 250/367

(58) Field of Classification Search
USPC .............................................. 250/367, 361 R
See application file for complete search history.

(56) References Cited

U.S. PATENT DOCUMENTS

| | | | |
|---|---|---|---|
| 7,256,404 B2 | 8/2007 | Inoue et al. | |
| 7,315,027 B2 | 1/2008 | Okada et al. | |
| 7,391,029 B2 | 6/2008 | Takeda et al. | |
| 7,514,686 B2 | 4/2009 | Ogawa et al. | |
| 7,538,330 B2 | 5/2009 | Nomura et al. | |
| 7,595,493 B2 | 9/2009 | Okada et al. | |
| 7,714,294 B2 | 5/2010 | Sawada et al. | |
| 7,723,693 B2 | 5/2010 | Okada et al. | |
| 7,893,405 B2 | 2/2011 | Nagano et al. | |
| 7,952,058 B2 | 5/2011 | Nomura et al. | |
| 8,115,177 B2 | 2/2012 | Takeda et al. | |
| 2007/0040125 A1* | 2/2007 | Sato et al. ............... | 250/367 |
| 2008/0083877 A1 | 4/2008 | Nomura et al. | |
| 2009/0200479 A1 | 8/2009 | Nomura et al. | |
| 2010/0102236 A1 | 4/2010 | Inoue et al. | |
| 2011/0291018 A1 | 12/2011 | Nagano et al. | |
| 2011/0309258 A1 | 12/2011 | Ishida et al. | |
| 2012/0219115 A1 | 8/2012 | Okada et al. | |

FOREIGN PATENT DOCUMENTS

| | | |
|---|---|---|
| JP | 2005-148060 A | 6/2005 |
| JP | 2008-051793 A | 3/2008 |

OTHER PUBLICATIONS

U.S. Appl. No. 13/523,098, filed Jun. 14, 2012.

* cited by examiner

*Primary Examiner* — Kiho Kim
(74) *Attorney, Agent, or Firm* — Fitzpatrick, Cella, Harper & Scinto

(57) ABSTRACT

A method of manufacturing a radiation detection apparatus is provided. The apparatus comprises a first scintillator layer, a second scintillator layer, and a sensor panel that detects light emitted by the first scintillator layer and the second scintillator layer. The method comprises preparing a sensor unit having the sensor panel and the first scintillator layer which includes a set of columnar crystals formed on the sensor panel, and a scintillator panel having a scintillator substrate and the second scintillator layer which includes a set of columnar crystals formed on the scintillator substrate, and fixing the scintillator panel to the sensor panel such that the first scintillator layer and the second scintillator layer face each other.

23 Claims, 7 Drawing Sheets

F I G. 3A
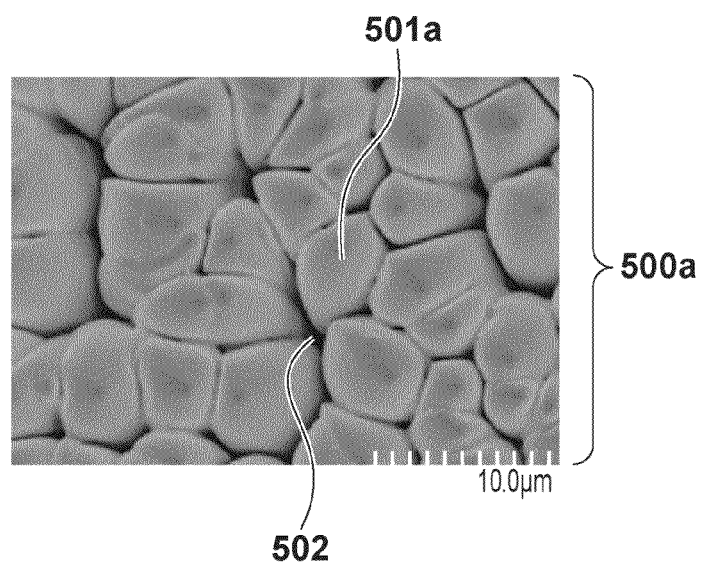
F I G. 3B
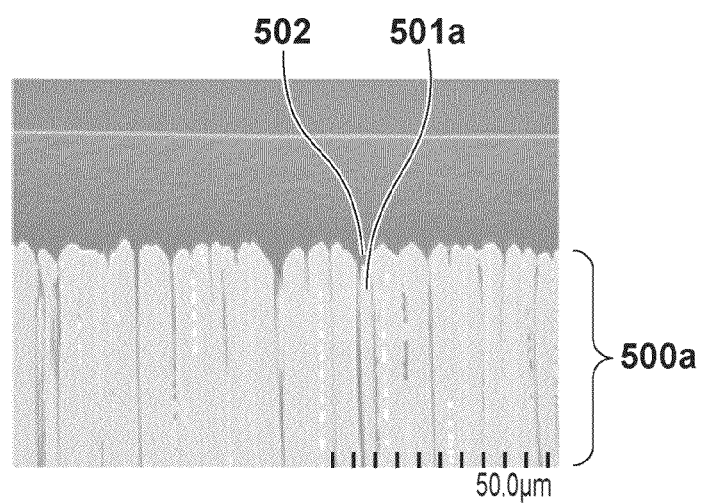
F I G. 3C
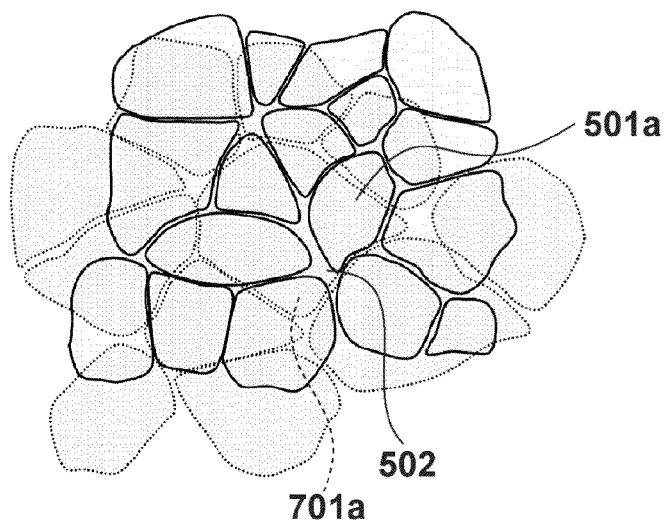

RADIATION DETECTION APPARATUS, MANUFACTURING METHOD THEREOF, AND RADIATION DETECTION SYSTEM

BACKGROUND OF THE INVENTION

1. Field of the Invention

The present invention relates to a radiation detection apparatus, a manufacturing method thereof, and a radiation detection system.

2. Description of the Related Art

In recent years, digital radiation detection apparatuses, in which a scintillator that converts radiation into light of a wavelength that can be detected by a photoelectric conversion element is laminated on a sensor panel on which a plurality of photoelectric conversion elements are formed, have been commercialized. Scintillators consisting of Tb-doped GdOS or an alkali halide material such as Tl-doped CsI are predominant. When a vacuum deposition method is performed using an alkali halide scintillator material, a scintillator layer that includes a set of columnar crystals is formed. However, as shown in FIGS. 3A and 3B, because a scintillator layer 500a has gaps 502 between columnar crystals 501a, some of the radiation incident on the scintillator layer passes through these gaps 502, and reaches the sensor panel without being converted into light. Because the sensor panel is not able to detect radiation that has not been converted into light, the detective quantum efficiency (DQE) of the radiation detection apparatus decreases.

In order to increase the amount of light emitted by the scintillator layer, Japanese Patent Laid-Open No. 2008-051793 proposes a radiation detection apparatus in which a plurality of scintillator layers having different concentration distributions of Tl are formed on a sensor panel. In order to suppress the growth of abnormal growth portions such as splashes, Japanese Patent Laid-Open No. 2005-148060 proposes a technique for forming a plurality of scintillator layers over a plurality of iterations.

SUMMARY OF THE INVENTION

Both of the abovementioned documents propose a technique for forming a plurality of scintillator layers over a plurality of iterations. However, in both documents, a new scintillator layer is formed by performing vacuum deposition on a scintillator layer that has already been formed. Because the columnar crystals of the subsequent scintillator layer grow in accordance with the crystallinity (arrangement of columnar crystals) of the previous scintillator layer in the case where scintillator layers are formed in this way, the gaps between the columnar crystals of the previous scintillator layer and the gaps between the columnar crystals of the subsequent scintillator layer overlap. Thus, the proportion of radiation that reaches the sensor panel without being converted into light cannot be adequately reduced. In view of this, an aspect of the present invention is to provide a technique for reducing the proportion of radiation that passes through gaps between columnar crystals included in a scintillator layer of a radiation detection apparatus and reaches a sensor panel without being converted into light.

A first aspect of the present invention provides a method of manufacturing a radiation detection apparatus comprising a first scintillator layer, a second scintillator layer, and a sensor panel that detects light emitted by the first scintillator layer and the second scintillator layer, the method comprising: preparing a sensor unit having the sensor panel and the first scintillator layer which includes a set of columnar crystals formed on the sensor panel, and a scintillator panel having a scintillator substrate and the second scintillator layer which includes a set of columnar crystals formed on the scintillator substrate; and fixing the scintillator panel to the sensor panel such that the first scintillator layer and the second scintillator layer face each other.

A second aspect of the present invention provides a radiation detection apparatus comprising: a sensor panel that detects light; a first scintillator layer that includes a set of columnar crystals grown from the sensor panel, and converts radiation into light detectable by the sensor panel; a scintillator substrate; and a second scintillator layer that includes a set of columnar crystals grown from the scintillator substrate, and converts radiation into light detectable by the sensor panel, wherein a face of the first scintillator layer on an opposite side to a face contacting the sensor panel faces a face of the second scintillator layer on an opposite side to a face contacting the scintillator substrate.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A-3C are diagrams illustrating the positional relationship of two scintillator layers of an embodiment of the present invention.

DESCRIPTION OF THE EMBODIMENTS

Figure 1A:
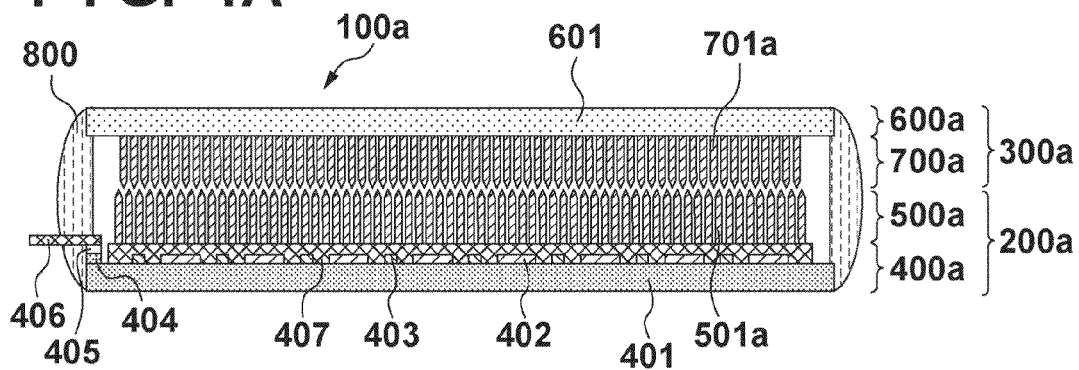
FIGS. 1A-1D are diagrams illustrating exemplary configurations of a radiation detection apparatus of various embodiments of the present invention.

Hereinafter, various embodiments of the present invention will be described in detail with reference to the attached drawings. The same reference numerals are given to the same components throughout the drawings, and redundant description will be omitted. Also, the same reference numbers followed by different alphabets are given to similar components throughout the drawings, and description will focus on the differences.

FIGS. 1A-1D and FIGS. 2A-2D are diagrams illustrating exemplary configurations of the radiation detection apparatus according to various embodiments of the present invention. A radiation detection apparatus 100a (first exemplary configuration) shown in FIG. 1A may comprise a sensor unit 200a and a scintillator panel 300a. The sensor unit 200a may comprise a sensor panel 400a and a first scintillator layer 500a. The scintillator panel 300a may comprise a scintillator substrate 600a and a second scintillator layer 700a.

The sensor panel 400a detects light converted from radiation by the first scintillator layer 500a or the second scintillator layer 700a. The sensor panel 400a may have any configuration that enables the position at which light is incident and the amount of incident light to be to detected, and an existing arbitrary sensor panel, for example, may be employed. An exemplary configuration of the sensor panel 400a will now be described. The sensor panel 400a may have an insulating substrate 401 consisting of glass or the like, and a pixel array constituted by a plurality of pixels arranged in an array on the substrate. Each pixel may include a photoelectric conversion element 402 and a thin film transistor (TFT; not shown). The photoelectric conversion element 402 or the TFT is connected to an electrically conductive pattern 403. The photoelectric conversion element 402 can produce electric charge according to light converted from radiation by the first scintillator layer 500a or the second scintillator layer 700a. The photoelectric conversion element 402 may be an MIS sensor, a PIN sensor, a TFT sensor, a CMOS sensor, or the like.

The sensor panel 400a may further comprise a protection film 407 that covers and protects the photoelectric conversion elements 402, the electrically conductive patterns 403, and the TFTs. An inorganic substance such as SiN, $TiO_2$, LiF, $Al_2O_3$ or MgO, for example, may be used as the material for the protection film 407. The radiation detection apparatus 100a may have a connection lead 404 such as a bonding pad that is disposed on the insulating substrate 401 of the sensor panel 400a, and the connection lead 404 is connected to the electrically conductive patterns 403. The radiation detection apparatus 100a may have external wiring 405 such as a flexible wiring substrate and a connection portion 406 such as solder or anisotropic conductive film (ACF). The connection lead 404 is electrically connected to the external wiring 405 through the connection portion 406. A signal obtained by the photoelectric conversion elements 402 is output to the outside through the connection portion 406.

The first scintillator layer 500a is disposed in a position covering the pixel array of the sensor panel 400a, and converts incident radiation into light that can be detected by the sensor panel 400a. The first scintillator layer 500a includes a set of columnar crystals 501a of alkali halide material such as CsI:Tl, CsI:Na or CsBr:Tl. The thickness of the first scintillator layer 500a, that is, the height of the columnar crystals 501a, is in a range of 100-1000 μm inclusive, for example. In this specification, the face of the first scintillator layer 500a that contacts the sensor panel 400a is called the growth start face, and the face on the opposite side thereto (face on the far side of the sensor panel 400a) is called the growth end face.

The scintillator substrate 600a may comprise a scintillator support substrate 601. The area of the scintillator support substrate 601 is typically greater than the area of the pixel array. The second scintillator layer 700a is disposed on one face of the scintillator substrate 600a, and converts radiation incident thereon into light that can be detected by the sensor panel 400a. The second scintillator layer 700a includes a set of columnar crystals 701a of alkali halide material such as CsI:Tl, CsI:Na or CsBr:Tl. The thickness of the second scintillator layer 700a, that is, the height of the columnar crystals 701a, is in a range of 100-1000 μm inclusive, for example. The face of the second scintillator layer 700a that contacts the scintillator substrate 600a is called the growth start face, and the face on the opposite side thereof (face on the far side of the scintillator substrate 600a) is called the growth end face.

The scintillator support substrate 601 is capable of holding the second scintillator layer 700a, and may be formed with a material that does not deform at temperatures reached during vacuum deposition. For example, in the case of using a metal for the scintillator support substrate 601, a metal having low radiation absorption such as aluminum, aluminum alloy, magnesium or magnesium alloy may be used. Alternatively, a material having heat resistance and low radiation absorption such as a carbon resin, PPS resin or polyimide resin may be used for the scintillator support substrate 601. In the case of using a metal as the material, the scintillator support substrate 601 also functions as a reflection layer. That is, light converted and emitted by the first scintillator layer 500a or the second scintillator layer 700a that reaches the opposite side to the sensor panel 400a is reflected by the scintillator support substrate 601 and guided to the sensor panel 400a. Light use efficiency can thereby be improved. Also, the scintillator support substrate 601 that functions as a reflection layer can block light from outside the radiation detection apparatus 100a.

The sensor unit 200a and the scintillator panel 300a are laid one on top of the other such that the growth end face of the first scintillator layer 500a faces the growth end face of the second scintillator layer 700a, and are fixed by a sealing member 800. The sealing member 800 is adhered to a side face of the insulating substrate 401 and a side face of the scintillator support substrate 601 around the entire periphery thereof, and prevents moisture from infiltrating into the first scintillator layer 500a and the second scintillator layer 700a from outside the radiation detection apparatus 100a. A resin such as an epoxy resin, an acrylic resin, a silicone resin or a fluorine resin, for example, may be used as the material for the sealing member 800. Of these resins, the durability of the radiation detection apparatus 100a can be improved by using an epoxy resin having high moisture proofness. The first scintillator layer 500a and the second scintillator layer 700a may each be disposed in a position covering the pixel array of the sensor panel 400a. For this reason, the area of the growth start face and the growth end face of the second scintillator layer 700a is typically greater than or equal to the area of the pixel array. Also, the growth end face of the second scintillator layer 700a may have an area comparable to the growth end face of the first scintillator layer 500a.

The radiation detection apparatus 100a has a structure in which the first scintillator layer 500a and the second scintillator layer 700a are laminated. Thus, light converted from radiation by the first scintillator layer 500a or the second scintillator layer 700a is incident on the photoelectric conversion elements 402 of the sensor panel 400a. FIGS. 3A-3C are diagrams illustrating the structure of the first scintillator layer 500a and the second scintillator layer 700a. FIG. 3A is a plane SEM photograph of the first scintillator layer 500a, and FIG. 3B is a cross-sectional SEM photograph of the first scintillator layer. The second scintillator layer 700a has a similar structure. FIG. 3C is a diagram illustrating the positional relationship of the first scintillator layer 500a and the second scintillator layer 700a, with each columnar crystal of the second scintillator layer 700a being shown transmissively for the purpose of description, and the outline thereof shown by a dotted line. As shown in FIG. 3A, in the case where the first scintillator layer 500a is formed by a vacuum deposition method, a set of columnar crystals 501a having irregular shapes and column diameters is formed. Thus, gaps 502 occur between adjacent columnar crystals 501a, and radiation irradiated into these gaps 502 reaches the sensor panel 400a without being converted into light and cannot be detected by the sensor panel 400a. The conversion efficiency from radiation into light is thus not adequately obtained with only the first scintillator layer 500a. In contrast, the radiation detection apparatus 100a has a structure in which the first scintillator layer 500a and second scintillator layer 700a vacuum-deposited on different substrates are laminated. Thus, the arrangement of the columnar crystals 501a in the first scintillator layer 500a and the arrangement of the columnar crystals 701a in the second scintillator layer 700a are not mutually correlated. As a result, the gaps between the columnar crystals of the first scintillator layer 500a and the gaps between the columnar crystals of the second scintillator layer 700a can be disposed so as to be mutually displaced. For example, as shown in FIG. 3C, the columnar crystals 701a of the second scintillator layer 700a can be disposed so as to overlap with the gaps 502 between the columnar crystals 501a of the first scintillator layer 500a. The proportion of radiation that reaches the sensor panel 400a without being converted into light by the scintillators can thereby be reduced, and the detective quantum efficiency (DQE) of radiation detected by the radiation detection apparatus 100a improves.

Although the first scintillator layer 500a and the second scintillator layer 700a have comparable thicknesses in the radiation detection apparatus 100a, these thicknesses may differ as discussed later. Also, with the radiation detection apparatus 100a, the columnar crystals 501a of the first scintillator layer 500a and the columnar crystals 701a of the second scintillator layer 700a have comparable column diameters (e.g., 5 µm on average). In other words, the first scintillator layer 500a and the second scintillator layer 700a have a comparable number of columnar crystals per unit area. However, the column diameters and number of crystals thereof may differ as discussed later. Although an example was shown in which the second scintillator layer 700a covers the entire pixel array of the sensor panel 400a in the radiation detection apparatus 100a, a configuration may be adopted in which only a portion of the pixel array is covered, enabling the radiation DQE to be improved in that portion.

Figure 1B:
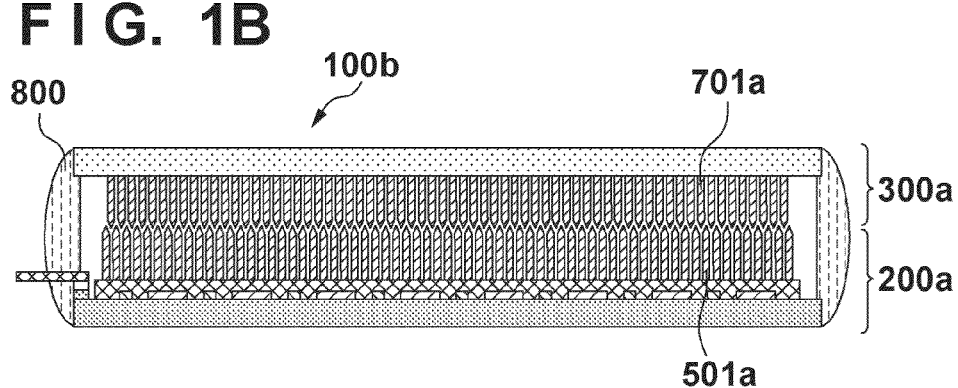

An exemplary configuration of a radiation detection apparatus 100b according to another embodiment of the present invention (second exemplary configuration) will be described with reference to FIG. 1B. The radiation detection apparatus 100b may comprise the aforementioned sensor unit 200a, scintillator panel 300a, and sealing member 800. The tips of the columnar crystals 501a and 701a formed using a vacuum deposition method may have a tapered shape as shown in FIG. 3B. In view of this, with the radiation detection apparatus 100b, the scintillator panel 300a is fixed to the sensor unit 200a, so that the tips of the columnar crystals 501a fit between mutually adjacent columnar crystals 701a and the tip of the columnar crystals 701a fit between mutually adjacent columnar crystals 501a. Adopting such a configuration enables the distance between the first scintillator layer 500a and the second scintillator layer 700a to be reduced, and the amount of the scattered light produced between these scintillator layers to be reduced.

Alternatively, the distance between the first scintillator layer 500a and the second scintillator layer 700a may be reduced by flattening the tips of the columnar crystals 501a and 701a through polishing or the like after the end of vacuum deposition.

Figure 1C:
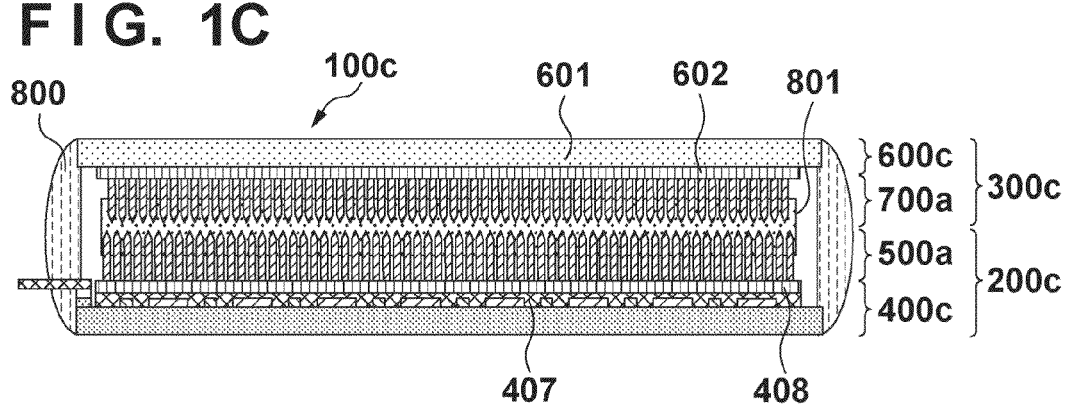

An exemplary configuration of a radiation detection apparatus 100c according to another embodiment of the present invention (third exemplary configuration) will be described with reference to FIG. 1C. In addition to a sensor unit 200c, a scintillator panel 300c and the sealing member 800, the radiation detection apparatus 100c may comprise a light-shielding layer 801 between the first scintillator layer 500a and the second scintillator layer 700a. The light-shielding layer 801 may have a mesh structure in which openings are arranged in the radiation incident direction. The light-shielding layer 801, having the mesh structure, allows optical crosstalk between both scintillator layers and obliquely incident radiation to be reduced in the radiation detection apparatus 100c. A material such as Pb or Fe that shields light and radiation may be used as the material for the light-shielding layer 801. Also, the thickness of the light-shielding layer 801 is 20-100 µm, for example, and the width of the mesh is 30-200 µm, for example. The size of the light-shielding layer 801 may be a size that is able to cover the pixel array of the sensor panel 400a.

The sensor unit 200c may comprise a sensor panel 400c and the aforementioned first scintillator layer 500a. The sensor panel 400c differs from the sensor panel 400a in having an organic protection layer 408 between the protection film 407 and the first scintillator layer 500a. By providing the organic protection layer 408, the durability of the sensor panel 400c can be further improved. Various existing organic resins may be used as the material for the organic protection layer 408.

The scintillator panel 300c may comprise a scintillator substrate 600c and the aforementioned second scintillator layer 700a. The scintillator substrate 600c differs from the scintillator substrate 600a in having a protection layer 602 between the scintillator support substrate 601 and the second scintillator layer 700a. By providing the protection layer 602, corrosion of the scintillator support substrate 601 due to the second scintillator layer 700a can be reduced, and the adhesion between the second scintillator layer 700a and the scintillator substrate 600c can be improved. An organic material such as a polyimide resin, an epoxy resin, an acrylic resin or a silicone resin or an inorganic material such as $Al_2O_3$, $SiO_2$ or $TiO_2$, for example, may be used as the material for the protection layer 602. The protection layer 602 and the organic protection layer 408 are applicable to any of the embodiments of the radiation detection apparatus described in this specification.

Figure 1D:
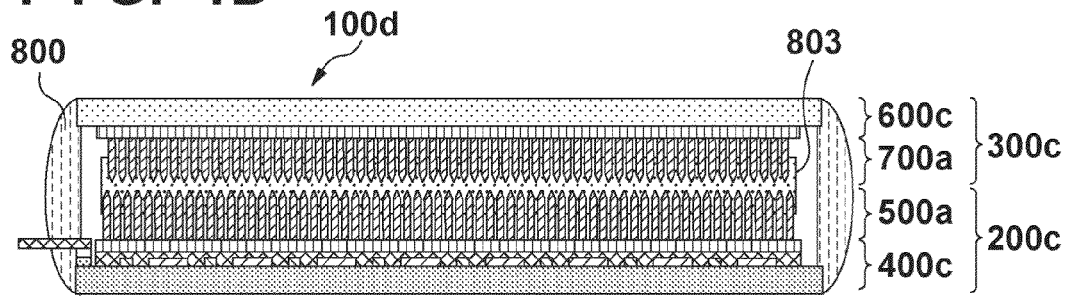

An exemplary configuration of a radiation detection apparatus 100d according to another embodiment of the present invention (fourth exemplary configuration) will be described with reference to FIG. 1D. In addition to the abovementioned sensor unit 200c, scintillator panel 300c and sealing member 800, the radiation detection apparatus 100d has an adhesive layer 803 between the first scintillator layer 500a and the second scintillator layer 700a. The adhesive layer 803 adheres and fixes the first scintillator layer 500a to the second scintillator layer 700a, and improves shock resistance by suppressing the knocking together and damaging of both scintillator layers. An adhesive material or a hot melt resin may be used as the material for the adhesive layer 803. The adhesive material is a material having adhesion with respect to other organic materials and inorganic materials at room temperature. The hot melt resin is a resin that melts when the resin temperature rises and thereby becomes adhesive with respect to other organic materials and inorganic materials, and solidifies when the resin temperature falls and thereby loses adhesion. Various existing materials may be used as the adhesive material and the hot melt resin.

Figure 2A:
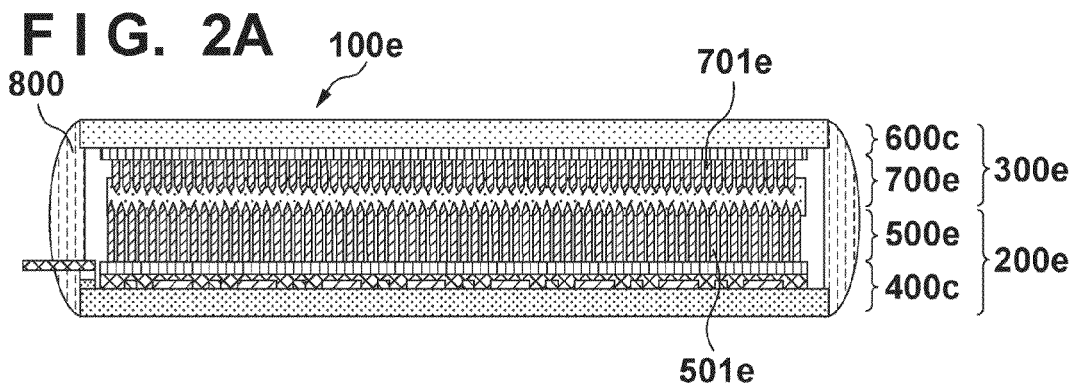
FIGS. 2A-2D are diagrams illustrating exemplary configurations of a radiation detection apparatus of various embodiments of the present invention.

An exemplary configuration of a radiation detection apparatus 100e according to another embodiment of the present invention (fifth exemplary configuration) will be described with reference to FIG. 2A. The radiation detection apparatus 100e may comprise a sensor unit 200e, a scintillator panel 300e, the sealing member 800, and the adhesive layer 803.

The sensor unit 200e may comprise the abovementioned sensor panel 400c and first scintillator layer 500e. The scintillator panel 300e may comprise the abovementioned scintillator substrate 600c and a second scintillator layer 700e. Although the first scintillator layer 500e and the second scintillator layer 700e have a set of columnar crystals similarly to the abovementioned embodiments, a difference exists in that the thickness of the first scintillator layer 500e (e.g., 550 µm) is greater than the thickness of the second scintillator layer 700e (e.g., 450 µm).

Figure 2B:
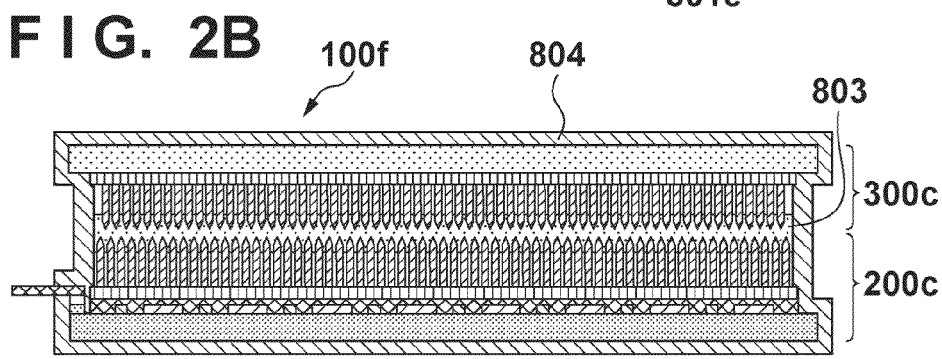

An exemplary configuration of a radiation detection apparatus 100f according to another embodiment of the present invention (sixth exemplary configuration) will be described with reference to FIG. 2B. In addition to the abovementioned sensor unit 200c, scintillator panel 300c and adhesive layer 803, the radiation detection apparatus 100f may comprise a protection film 804 that entirely envelops the sensor unit 200c and the scintillator panel 300c that are fixed by the adhesive layer 803. The protection film 804 enables infiltration of moisture into the first scintillator layer 500a and the second scintillator layer 700a from outside the radiation detection apparatus 100f to be suppressed, improving the moisture resistance of the radiation detection apparatus 100e. The protection film 804 may be either an organic protection film or an inorganic protection film, or may be a laminated structure thereof. A material such as poly-para-xylylene or polyurea that may be formed by vacuum deposition or a thermocompression-bonding resin such as a hot melt resin that may be formed by thermocompression bonding may be used as the organic protection film. A material such as $SiO_2$, $Al_2O_3$ or $TiO_2$ that may be formed by vacuum deposition may be used as the inorganic protection film. The side face of the radiation detection apparatus 100f enveloped with the protection film 804 may be enclosed with the abovementioned sealing member 800.

Figure 2C:
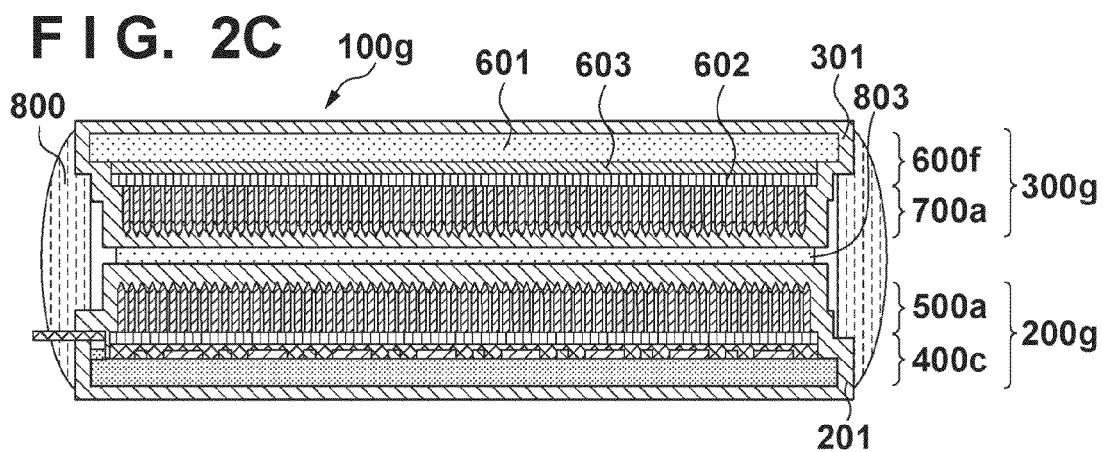

An exemplary configuration of a radiation detection apparatus 100g according to another embodiment of the present invention (seventh exemplary configuration) will be described with reference to FIG. 2C. The radiation detection apparatus 100g may comprise a sensor unit 200g, a scintillator panel 300g, the sealing member 800, and the adhesive layer 803. In addition to the abovementioned sensor panel 400c and the first scintillator layer 500a, the sensor unit 200g has a protection film 201 that covers the first scintillator layer 500a. The protection film 201 may entirely cover the sensor panel 400c and the first scintillator layer 500a as shown in FIG. 2C, or may cover only a portion including an exposed portion of the first scintillator layer 500a.

In addition to the scintillator substrate 600f and the second scintillator layer 700a, the scintillator panel 300g has a protection film 301 that covers the second scintillator layer 700a. The scintillator substrate 600f differs from the scintillator substrate 600c in having a reflection layer 603 between the scintillator support substrate 601 and the protection layer 602. A metal material such as aluminum, gold or silver may be used as the material for the reflection layer 603, and, of these, aluminum and gold having of high reflective properties may be used. The protection film 301 may entirely cover the scintillator substrate 600f and the second scintillator layer 700a as shown in FIG. 2C, or may cover only a portion including an exposed portion of the second scintillator layer 700a. The protection films 201 and 301 may both be formed with a similar material to the abovementioned protection film 804. In particular, c-PET and a-PET coextrusion resins which are polyester resins having adhesion only on one side may be used as the organic resins. Although FIG. 2C illustrates a configuration in which both the first scintillator layer 500a and the second scintillator layer 700a are covered respectively with the protection film 201 and the protection film 301, the present invention is not limited thereto. Although an embodiment in which only one of the scintillator layers is covered with a protection film may be adopted, a configuration in which both are covered enables moisture protection of the scintillator layers to be further improved.

Figure 2D:
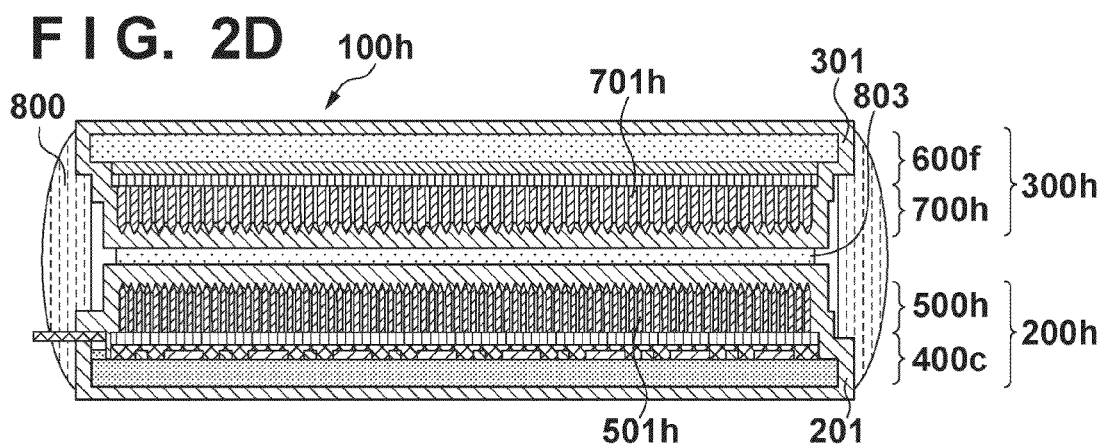

An exemplary configuration of a radiation detection apparatus 100h according to another embodiment of the present invention (eighth exemplary configuration) will be described with reference to FIG. 2D. The radiation detection apparatus 100h may comprise a sensor unit 200h, a scintillator panel 300h, the sealing member 800, and the adhesive layer 803. The sensor unit 200h differs from the sensor unit 200g in comprising a first scintillator layer 500h. The scintillator panel 300h differs from the scintillator panel 300g in comprising a second scintillator layer 700h. The first scintillator layer 500h and the second scintillator layer 700h each have a set of columnar crystals, similarly to the abovementioned embodiments. However, a difference exists in that the average column diameter of the columnar crystals 501h of the first scintillator layer 500h (average approx. 5 µm from 2-8 µm) is smaller than an average column diameter of the columnar crystals 701h of the second scintillator layer 700h (average approx. 7 µm from 4-10 µm). In other words, there are more columnar crystals 501h per unit area of the first scintillator layer 500h than there are columnar crystals 701h per unit area of the second scintillator layer 700h.

By increasing the column diameter of the columnar crystals 701h of the second scintillator layer 700h nearer the radiation incident side, incident radiation can be efficiently captured. In other words, the proportion occupied by the columnar crystals 701h in a cross-section of the second scintillator layer 700h can be increased. Also, by decreasing the column diameter of the columnar crystals 501h of the first scintillator layer 500h nearer the sensor panel 400c, the column diameter of the columnar crystals 501h may be sufficiently decreased as compared with the area of the photoelectric conversion elements 402. The columnar crystals 501h thereby function as a fiber optic plate (FOP), and light produced by the first scintillator layer 500h and the second scintillator layer 700h may be guided to the photoelectric conversion elements 402. The detective quantum efficiency of radiation by the radiation detection apparatus 100h thereby further improves.

Next, a manufacturing method of the abovementioned radiation detection apparatuses 100a to 100h will be described. The manufacturing method mainly has a preparation step of preparing the sensor unit and the scintillator panel, and a fixing step of fixing the scintillator panel to the sensor unit. As mentioned beforehand, the DQE of radiation detected by the radiation detection apparatus improves as a result of forming two scintillator layers independently on different substrates, and laminating these scintillator layers. A plurality of embodiments of the preparation step and a plurality of embodiments of the fixing step will be described hereinafter. Unless particularly stated otherwise, the embodiments of the preparation step and the embodiments of the fixing step may be arbitrary combined. Since the connection lead 404, the external wiring 405 and the connection portion 406 may be attached at arbitrary points in time with existing techniques, description thereof is omitted hereinafter.

A first embodiment of the preparation step will be described hereinafter. First, the sensor panel 400a and the scintillator substrate 600a are prepared. Since these manufacturing methods are well known in the field concerned, description thereof is omitted. For example, a scintillator substrate 600a having a 0.5 mm thick aluminum plate as the scintillator support substrate 601 is prepared. Also, a SiN film is formed as the protection film 407 of the sensor panel 400a, for example.

Figure 4A:
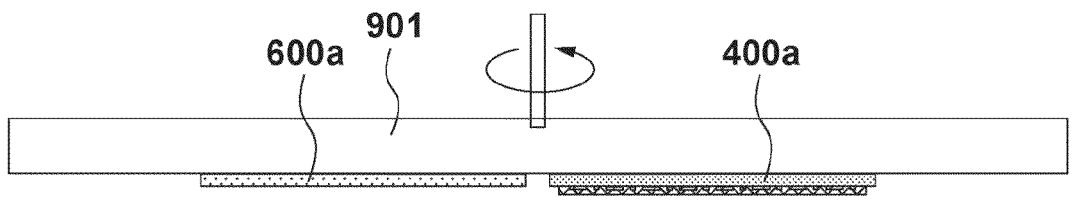
FIGS. 4A-4C are diagrams illustrating a preparation step of one embodiment of the present invention.
Figure 4B:
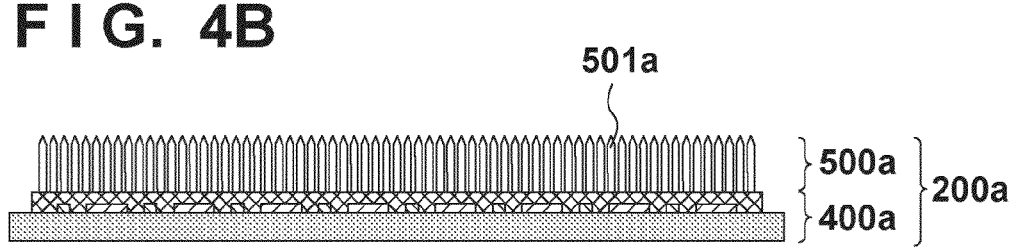
Figure 4C:
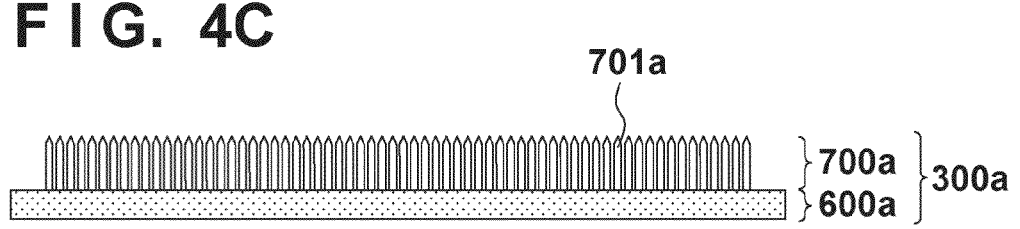

Next, as shown in FIG. 4A, the prepared sensor panel 400a and scintillator substrate 600a are mounted on a rotating holder 901 of a vacuum deposition apparatus so as to be positioned equidistantly from a rotation center. A resistive heating boat is filled with cesium iodide (CsI) and thallium iodide (TlI) as vacuum deposition materials; Ar gas is introduced while exhausting the inside of the vacuum deposition apparatus with a vacuum pump to adjust the degree of vacuum to 0.1 Pa; and vacuum deposition is performed. As shown in FIG. 4B, CsI:Tl columnar crystals 501a thereby grow on the sensor panel 400a, and the first scintillator layer 500a is formed. Also, at the same time, as shown in FIG. 4C, CsI:Tl columnar crystals 701a grow on the scintillator substrate 600a, and the second scintillator layer 700a is formed. For example, vacuum deposition is performed such that the thickness of the first scintillator layer 500a will be 500 µm, and the average column diameter of the columnar crystals 501a will be 5 µm. The sensor panel 400a and the scintillator substrate 600a are arranged equidistantly from the rotation center of the rotating holder 901. Thus, the thickness of the second scintillator layer 700a will also be 500 µm, and the average column diameter of the columnar crystals 701a will also be 5 µm. The abovementioned sensor unit 200a and scintillator panel 300a may be prepared in this way.

In this embodiment of the preparation step, the vacuum deposition time is shorter as compared with the case where a single scintillator layer having the total thickness of the first scintillator layer 500a and the second scintillator layer 700a is formed. Thus, growth of splashes can be suppressed, as well as being able to achieve a reduction in the number of steps and cost.

The sensor unit 200c may be prepared by performing the abovementioned vacuum deposition using the sensor panel 400c instead of the sensor panel 400a. The sensor panel 400c may be prepared by coating polyimide resin on the protection film 407 to form a 10 µm thick organic protection layer 408. Also, the scintillator panel 300c may be prepared, by performing the abovementioned vacuum deposition using the scintillator substrate 600c instead of the scintillator substrate 600a. The scintillator substrate 600c may be prepared by, for example, applying polyimide resin on the scintillator support substrate 601 to form a 10 µm thick protection layer 602.

Next, a second embodiment of the preparation step will be described. First, the sensor panel 400c and the scintillator substrate 600f are prepared. The scintillator substrate 600f may be prepared by vacuum-depositing Al using a 1 mm thick amorphous carbon plate, for example, as the scintillator support substrate 601 to form a 10 µm thick reflection layer 603, and applying polyimide resin to form a 10 µm thick protection layer 602. The first scintillator layer 500a and the second scintillator layer 700a are then formed similarly to the first embodiment. Thereafter, Myler 850 (produced by Teijin DuPont Films), for example, is thermocompression bonded to the sensor panel 400c and the first scintillator layer 500a to form a 15 µm thick protection film 201. The sensor unit 200g can thereby be prepared. Also, Myler 850 (produced by Teijin DuPont Films), for example, is thermocompression bonded to the scintillator substrate 600f and the second scintillator layer 700a to form a 15 µm thick protection film 301. The scintillator panel 300g can thereby be prepared. Infiltration of moisture during the manufacturing steps may be mitigated by covering the first scintillator layer 500a and the second scintillator layer 700a with the protection films 201 and 301 prior to the fixing step.

Figure 5:
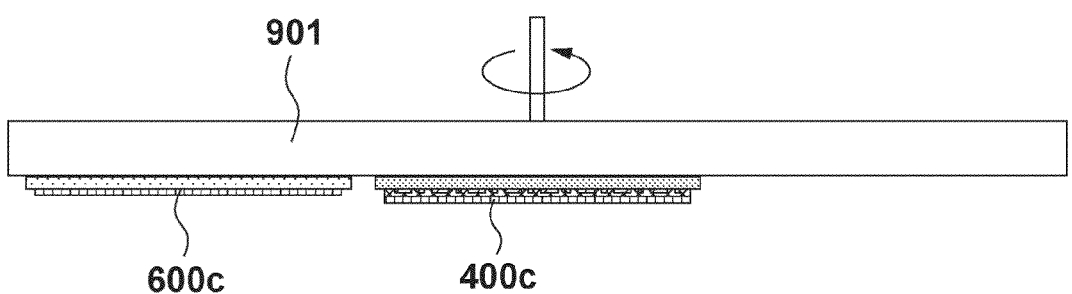
FIG. 5 is a diagram illustrating a preparation step of another embodiment of the present invention.

Next, a third embodiment of the preparation step will be described. First, the sensor panel 400c and the scintillator substrate 600c are prepared similarly to the abovementioned examples. Next, as shown in FIG. 5, the prepared sensor panel 400c and scintillator substrate 600c are mounted on the rotating holder 901 of the vacuum deposition apparatus. In this example, the sensor panel 400c is mounted so as to be nearer the rotation center of the rotating holder 901 than is the scintillator substrate 600c. A resistive heating boat is then filled with CsI and TlI as vacuum deposition materials, Ar gas is introduced while exhausting the inside of the vacuum deposition apparatus with a vacuum pump to adjust the degree of vacuum to 0.1 Pa, and vacuum deposition is performed. CsI:Tl columnar crystals 501e thereby grow on the sensor panel 400c, and the first scintillator layer 500e is formed. Also, at the same time, CsI:Tl columnar crystals 701e grow on the scintillator substrate 600c, and the second scintillator layer 700e is formed. For example, vacuum deposition is performed such that the thickness of the first scintillator layer 500a will be 550 µm, and the average column diameter of the columnar crystals 501a will be 5 µm. The sensor panel 400c is mounted so as to be nearer the rotation center of the rotating holder 901 than is the scintillator substrate 600c. Thus, the thickness of the second scintillator layer 700e will be 550 µm, for example, which is greater than the first scintillator layer 500e, and the average column diameter of the columnar crystals 701a will be 5 µm. The abovementioned sensor unit 200e and scintillator panel 300e can be prepared in this way. The thicknesses of the scintillator layers that are formed can thus be adjusted by adjusting the distance from the rotation center, and sorting of scintillator layers according to properties can be carried out.

Next, a fourth embodiment of the preparation step will be described. First, the sensor panel 400c and the scintillator substrate 600f are prepared, similarly to the abovementioned examples. Next, the prepared sensor panel 400c is mounted in the center of the rotating holder 901 of the vacuum deposition apparatus. A resistive heating boat is then filled with CsI and TlI as vacuum deposition materials, Ar gas is introduced while exhausting the inside of the vacuum deposition apparatus with a vacuum pump to adjust the degree of vacuum to 1 Pa, and vacuum deposition is performed (first vacuum deposition step). CsI:Tl columnar crystals 501h thereby grow on the sensor panel 400c, and the first scintillator layer 500h is formed. For example, the thickness of the first scintillator layer 500h is 500 µm, and the average column diameter of the columnar crystals 501h is 3 µm. The sensor unit 200h may be prepared by vacuum-depositing poly-para-xylylene, for example, to form the protection film 201.

Next, the prepared scintillator substrate 600c is mounted in the center of the rotating holder 901 of the vacuum deposition apparatus. A resistive heating boat is then filled with CsI and TlI as vacuum deposition materials, Ar gas is introduced while exhausting the inside of the vacuum deposition apparatus with a vacuum pump to adjust the degree of vacuum to 0.05 Pa, and vacuum deposition is performed (second vacuum deposition step). CsI:Tl columnar crystals 701h thereby grow on the scintillator substrate 600c, and the second scintillator layer 700h is formed. For example, the thickness of the second scintillator layer 700h is 500 µm, and the average column diameter of the columnar crystals 701h is 7 µm. The scintillator panel 300h may then be prepared by vacuum-depositing poly-para-xylylene, for example, to form the protection film 301. In this example, the average column diameter of the columnar crystals 501h of the first scintillator layer 500h and the average column diameter of the columnar crystals 701h of the second scintillator layer 700h can be differentiated by executing separate vacuum deposition steps with different degrees of vacuum. In this embodiment, because the degree of vacuum (0.05 Pa) in the second vacuum deposition step is lower than the degree of vacuum (1 Pa) in the first vacuum deposition step, the average column diameter (7 μm) of the columnar crystals 701h will be greater than the average column diameter (3 μm) of the columnar crystals 501h.

Figure 6A:
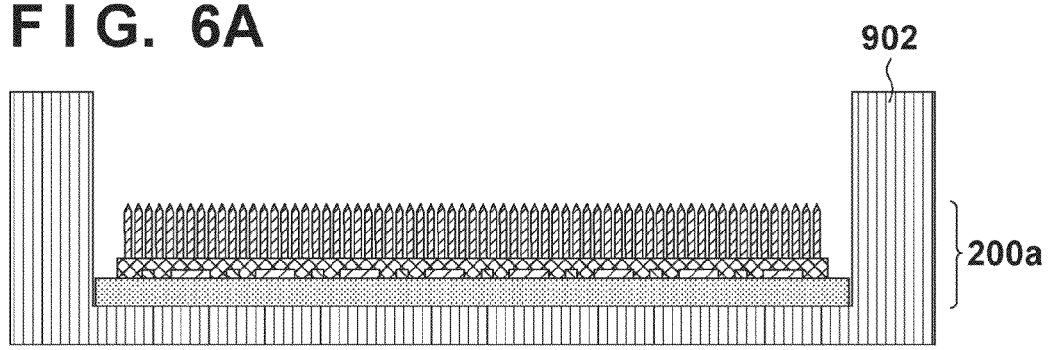
FIGS. 6A-6C are diagrams illustrating a fixing step of one embodiment of the present invention.
Figure 6B:
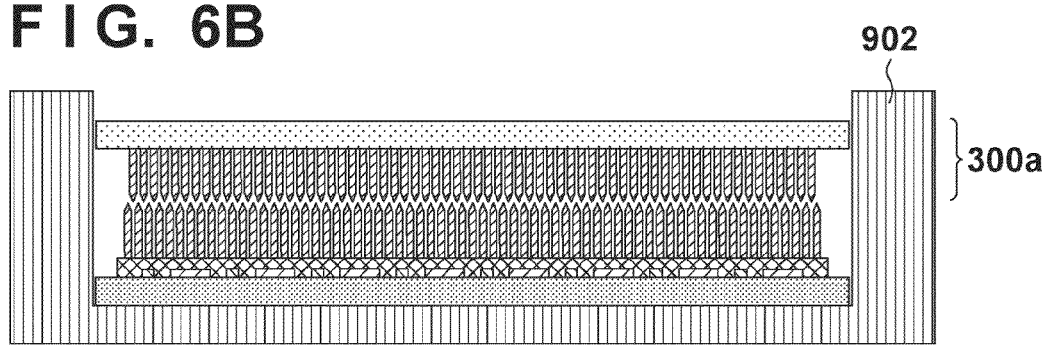

Next, a first embodiment of the fixing step will be described. First, as shown in FIG. 6A, the sensor unit 200a prepared in the abovementioned preparation step is put in a recessed portion of a frame member 902. At this time, the sensor unit 200a is placed so that the first scintillator layer 500a is positioned above the sensor panel 400a. A frame member 902 is used in which the area of the recessed portion is slightly larger than the insulating substrate 401 of the sensor unit 200a. Next, as shown in FIG. 6B, the scintillator panel 300a prepared in the abovementioned preparation step is put in the recessed portion of the frame member 902 and stacked on top of the sensor unit 200a. At this time, the scintillator panel 300a is placed so that the second scintillator layer 700a is positioned below the scintillator substrate 600a. Here, a frame member 902 is used in which the size of the scintillator support substrate 601 of the scintillator panel 300a is slightly smaller than the area of the recessed portion. The sensor unit 200a and the scintillator panel 300a can thereby be positioned, and are disposed in positions where the growth end face of the first scintillator layer 500a faces the growth end face of the second scintillator layer 700a.

Figure 6C:
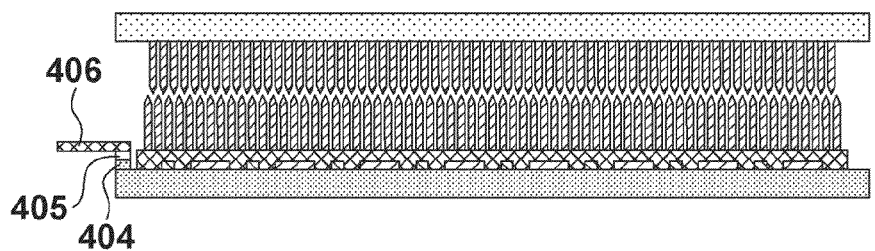

Next, as shown in FIG. 6C, the laminated sensor unit 200a and the scintillator panel 300a are removed from the frame member 902. The radiation detection apparatus 100a is then formed by attaching the connection lead 404, the external wiring 405 and the connection portion 406 to the sensor unit 200a, and fixing the sensor unit 200a and the scintillator panel 300a with a sealing member 800 consisting of epoxy resin, for example.

Figure 7:
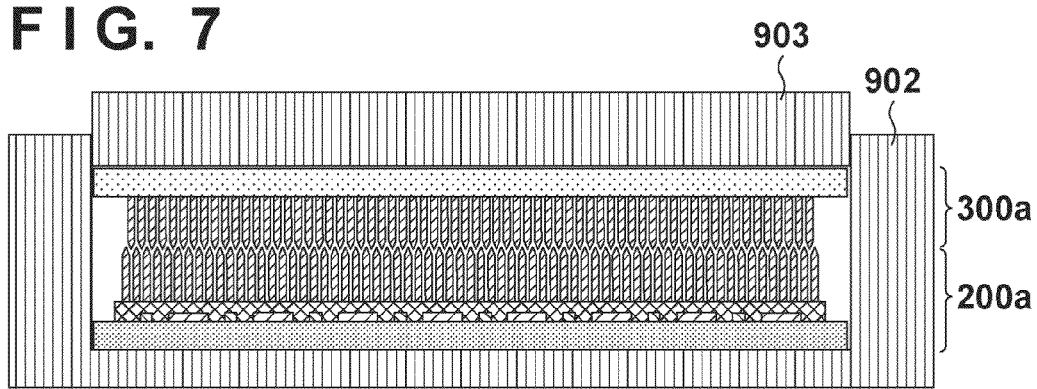
FIG. 7 is a diagram illustrating a fixing step of another embodiment of the present invention.

Also, after putting the sensor unit 200a and the scintillator panel 300a in the recessed portion of the frame member 902, the scintillator panel 300a is pressed at a pressure of 1 MPa, for example, relative to the sensor unit 200a using a press unit 903, as shown in FIG. 7. The scintillator panel 300a is thereby pressed against the sensor unit 200a. Thereafter, the sealing member 800 is formed as mentioned above, and the radiation detection apparatus 100b is formed.

Figure 8A:
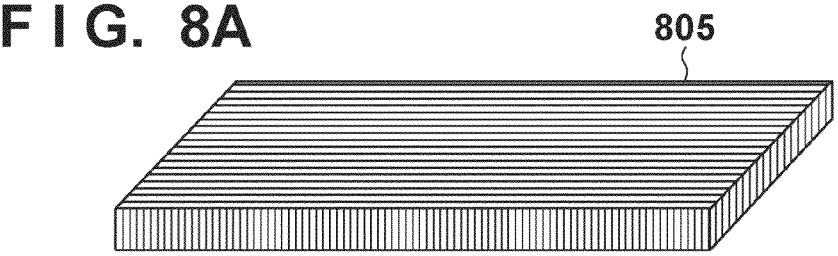
FIGS. 8A-8C are diagrams illustrating a fixing step of another embodiment of the present invention.
Figure 8B:
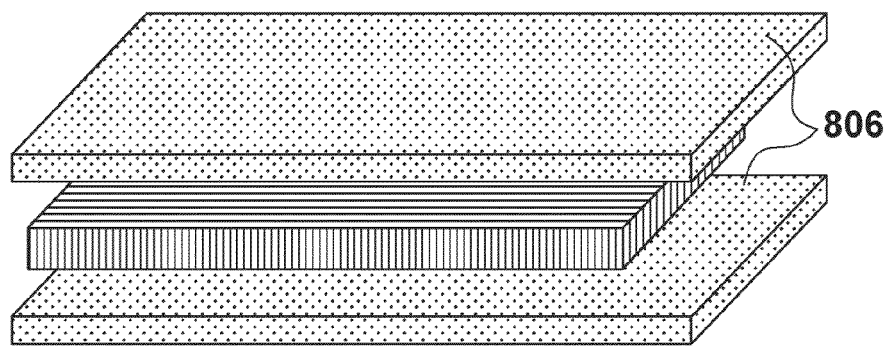
Figure 8C:
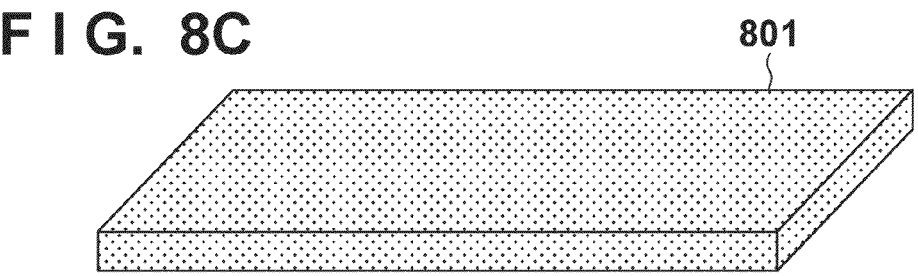

Next, a second embodiment of the fixing step will be described. First, the light-shielding layer 801 having the mesh structure is prepared. The light-shielding layer 801 can be formed by the following method, for example. First, as shown in FIG. 8A, a light-shielding material 805 that has a mesh structure formed with Pb or Fe, a thickness of 20-100 μm and a mesh width of 30-200 μm is prepared. As shown in FIG. 8B, a light-shielding layer 801 such as shown in FIG. 8C can then be formed by sandwiching the light-shielding material 805 between adhesive layers 806 consisting of hot melt resin or an adhesive material, and performing thermocompression bonding with a vacuum laminator or a heat roller. After putting the light-shielding layer 801 thus prepared in the frame member 902 in which the sensor unit 200c has been put, the radiation detection apparatus 100d is formed by further putting the scintillator panel 300c therein.

Figure 9:
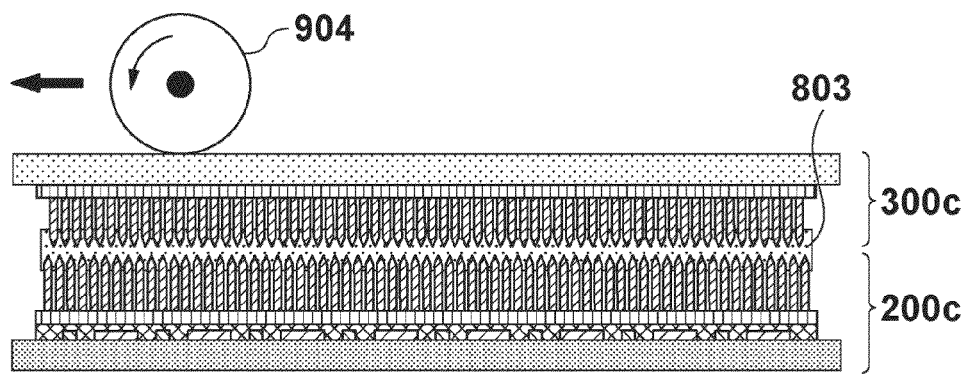
FIG. 9 is a diagram illustrating a fixing step of another embodiment of the present invention.

Next, a third embodiment of the fixing step will be described. Similarly to the second embodiment, as shown in FIG. 9, after laminating the sensor unit 200c, the adhesive layer 803 and the scintillator panel 300c, thermocompression bonding is performed while removing air bubbles between the scintillator layers 500a and 700a and the adhesive layer 803 using a roll laminator 904. For example, CS9621T (Nitto Denko Corporation) is used as the adhesive layer 803. The scintillator panel 300c is fixed to the sensor unit 200c through the adhesive layer 803.

Thereafter, the radiation detection apparatus 100d is formed by forming the sealing member 800 similarly to the abovementioned embodiments. Also, a 10 μm thick polyurea film is formed by vacuum deposition around the sensor unit 200c, the adhesive layer 803 and the scintillator panel 300c. Thereafter, a 100 nm thick $Al_2O_3$ film is formed by vacuum deposition, and a 2 μm thick polyurea film is further formed by vacuum deposition to form the protection film 804. The radiation detection apparatus 100f is thereby formed.

Figure 10:
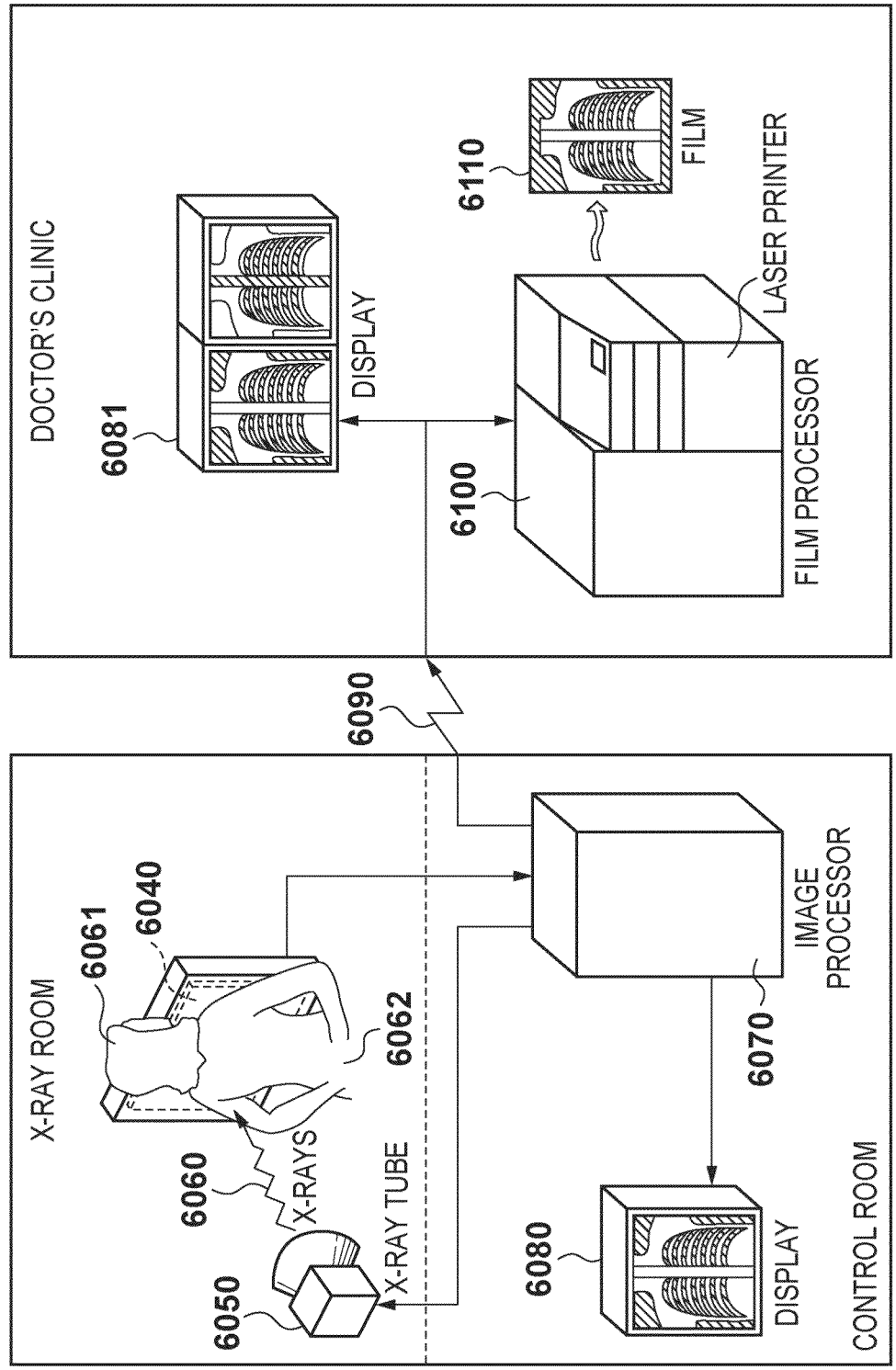
FIG. 10 is a diagram illustrating an exemplary configuration of a radiation detection system of an embodiment of the present invention.

FIG. 10 is a diagram showing an exemplary application in a diagnostic X-ray system (radiation detection system) of a radiation detection apparatus according to the present invention. X-rays 6060 serving as radiation generated by an X-ray tube 6050 (radiation source) pass through a chest 6062 of a subject or patient 6061, and are incident on a radiation detection apparatus 6040 that may be any of the abovementioned radiation detection apparatuses 100a to 100h. Information about the body of the patient 6061 is included in these incident X-rays. Scintillators emit light in response to the incidence of the X-rays, photoelectrically convert the emitted light, and obtain electrical information. This information is converted into a digital signal, image processing is performed by the image processor 6070 serving as signal processing means, and may be monitored on a display 6080 serving as display means in a control room. Note that a radiation detection system has at least a detection apparatus and signal processing means that processes signals from the detection apparatus.

Also, this information may be transferred to a remote location by transmission processing means such as a telephone line 6090, and may be displayed on a display 6081 serving as display means in another location such as a doctor's clinic or saved in recording means such as an optical disc, enabling a doctor at the remote location to make a diagnosis. This information may also be recorded by a film processor 6100 serving as recording means on a film 6110 serving as a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-164766 filed Jul. 27, 2011, which is hereby incorporated by reference herein in its entirety.

What is claimed is:

1. A method of manufacturing a radiation detection apparatus comprising a first scintillator layer, a second scintillator layer, and a sensor panel that detects light emitted by the first scintillator layer and the second scintillator layer, the method comprising:

preparing a sensor unit having the sensor panel and the first scintillator layer which includes a set of columnar crystals formed on the sensor panel, and a scintillator panel having a scintillator substrate and the second scintillator layer which includes a set of columnar crystals formed on the scintillator substrate; and fixing the scintillator panel to the sensor panel such that the first scintillator layer and the second scintillator layer face each other, wherein the step of fixing includes attaching the sensor unit and the scintillator panel using an adhesive layer formed between the first scintillator layer and the second scintillator layer.

2. The method according to claim 1,
wherein the step of preparing includes forming the first scintillator layer on the sensor panel by vacuum deposition, and forming the second scintillator layer on the scintillator substrate by vacuum deposition, and a degree of vacuum used in the vacuum deposition for forming the second scintillator layer is lower in pressure than a degree of vacuum used in the vacuum deposition for forming the first scintillator layer.

3. The method according to claim 1, wherein the step of preparing includes forming the first scintillator layer and the second scintillator layer, by mounting the sensor panel and the scintillator substrate on a rotating holder and performing vacuum deposition simultaneously.

4. The method according to claim 3, wherein the sensor panel and the scintillator substrate are mounted equidistantly from a rotation center of the rotating holder.

5. The method according to claim 3, wherein the sensor panel is mounted nearer the rotation center of the rotating holder than is the scintillator substrate.

6. The method according to claim 1, wherein the step of preparing further includes flattening tips of the first scintillator and tips of the second scintillator prior to the step of fixing.

7. The method according to claim 1, wherein the step of preparing further includes covering the second scintillator layer with a protection film prior to the step of fixing.

8. The method according to claim 1, wherein the step of preparing further includes covering the first scintillator layer with a protection film prior to the step of fixing.

9. A radiation detection apparatus comprising:
a sensor panel that detects light;
a first scintillator layer that includes a set of columnar crystals grown from the sensor panel, and converts radiation into light detectable by the sensor panel;
a scintillator substrate; and
a second scintillator layer that includes a set of columnar crystals grown from the scintillator substrate, and converts radiation into light detectable by the sensor panel,
wherein a face of the first scintillator layer on an opposite side to a face contacting the sensor panel faces a face of the second scintillator layer on an opposite side to a face contacting the scintillator substrate using an adhesive layer formed between the first scintillator layer and the second scintillator layer.

10. The apparatus according to claim 9, wherein the number of the columnar crystals per unit area of the first scintillator layer is greater than the number of the columnar crystal per unit area of the second scintillator layer.

11. A radiation detection system comprising: the radiation detection apparatus according to claim 9; and a signal processing unit that processes a signal obtained by the radiation detection apparatus.

12. A method of manufacturing a radiation detection apparatus comprising a first scintillator layer, a second scintillator layer, and a sensor panel that detects light emitted by the first scintillator layer and the second scintillator layer, the method comprising:

preparing a sensor unit having the sensor panel and the first scintillator layer which includes a set of columnar crystals formed on the sensor panel, and a scintillator panel having a scintillator substrate and the second scintillator layer which includes a set of columnar crystals formed on the scintillator substrate; and fixing the scintillator panel to the sensor panel such that the first scintillator layer and the second scintillator layer face each other, wherein the step of fixing includes attaching the sensor unit and the scintillator panel using a sealing member adhered to a side face of the sensor panel and a side face of the scintillator substrate.

13. The method according to claim 12,
wherein the step of preparing includes forming the first scintillator layer on the sensor panel by vacuum deposition, and forming the second scintillator layer on the scintillator substrate by vacuum deposition, and a degree of vacuum used in the vacuum deposition for forming the second scintillator layer is lower in pressure than a degree of vacuum used in the vacuum deposition for forming the first scintillator layer.

14. The method according to claim 12, wherein the step of preparing includes forming the first scintillator layer and the second scintillator layer, by mounting the sensor panel and the scintillator substrate on a rotating holder and performing vacuum deposition simultaneously.

15. The method according to claim 14, wherein the sensor panel and the scintillator substrate are mounted equidistantly from a rotation center of the rotating holder.

16. The method according to claim 14, wherein the sensor panel is mounted nearer the rotation center of the rotating holder than is the scintillator substrate.

17. The method according to claim 12, wherein the step of fixing includes attaching the sensor unit and the scintillator panel using an adhesive layer formed between the first scintillator layer and the second scintillator layer.

18. The method according to claim 12, wherein the step of preparing further includes flattening tips of the first scintillator and tips of the second scintillator prior to the step of fixing.

19. The method according to claim 12, wherein the step of preparing further includes covering the second scintillator layer with a protection film prior to the step of fixing.

20. The method according to claim 12, wherein the step of preparing further includes covering the first scintillator layer with a protection film prior to the step of fixing.

21. A radiation detection apparatus comprising:
a sensor panel that detects light;
a first scintillator layer that includes a set of columnar crystals grown from the sensor panel, and converts radiation into light detectable by the sensor panel;
a scintillator substrate; and
a second scintillator layer that includes a set of columnar crystals grown from the scintillator substrate, and converts radiation into light detectable by the sensor panel,
wherein a face of the first scintillator layer on an opposite side to a face contacting the sensor panel faces a face of the second scintillator layer on an opposite side to a face contacting the scintillator substrate using a sealing member adhered to a side face of the sensor panel and a side face of the scintillator substrate.

22. The apparatus according to claim 21, wherein the number of the columnar crystals per unit area of the first scintillator layer is greater than the number of the columnar crystal per unit area of the second scintillator layer.

23. A radiation detection system comprising:
the radiation detection apparatus according to claim 21; and a signal processing unit that processes a signal obtained by
the radiation detection apparatus.

* * * * *